United States Patent
Glira et al.

(10) Patent No.: US 11,935,189 B2
(45) Date of Patent: Mar. 19, 2024

(54) METHOD AND DEVICE FOR GENERATING A PHOTOGRAMMETRIC CORRIDOR MAP FROM A SET OF IMAGES

(71) Applicant: Siemens Energy Global GmbH & Co. KG, Bayern (DE)

(72) Inventors: Philipp Glira, Ganserndorf (AT);
Jürgen Hatzl, Grafenschachen (AT);
Michael Hornacek, Vienna (AT);
Stefan Wakolbinger, Graz (AT); Josef Alois Birchbauer, Seiersberg (AT);
Claudia Windisch, St. Johann (AT)

(73) Assignee: Siemens Energy Global GmbH & Co. KG, Munich (DE)

( * ) Notice: Subject to any disclaimer, the term of this patent is extended or adjusted under 35 U.S.C. 154(b) by 30 days.

(21) Appl. No.: 17/762,055

(22) PCT Filed: Sep. 30, 2020

(86) PCT No.: PCT/EP2020/077309
§ 371 (c)(1),
(2) Date: Mar. 19, 2022

(87) PCT Pub. No.: WO2021/063989
PCT Pub. Date: Apr. 8, 2021

(65) Prior Publication Data
US 2022/0392157 A1    Dec. 8, 2022

(30) Foreign Application Priority Data
Oct. 2, 2019 (EP) .................................... 19201148

(51) Int. Cl.
*G06T 17/05* (2011.01)
*G06T 7/80* (2017.01)

(52) U.S. Cl.
CPC ................ *G06T 17/05* (2013.01); *G06T 7/80* (2017.01); *G06T 2207/30244* (2013.01)

(58) Field of Classification Search
CPC . G06T 17/05; G06T 7/80; G06T 2207/30244; G06T 7/70; G01C 11/00
See application file for complete search history.

(56) References Cited

U.S. PATENT DOCUMENTS 9,830,706 B2 * 11/2017 Barajas Hernandez ..................... G06V 20/176
10,339,663 B2 * 7/2019 Barajas Hernandez ..................... G06T 17/05

(Continued)

OTHER PUBLICATIONS

PCT International Search Report and Written Opinion of International Searching Authority dated Jan. 22, 2021 corresponding to PCT International Application No. PCT/EP2020/077309 filed Sep. 30, 2020.

*Primary Examiner* — Vijay Shankar
(74) *Attorney, Agent, or Firm* — Wolter Van Dyke Davis, PLLC (57) ABSTRACT

A method for generating a photogrammetric corridor map from a set of input images by recovering a respective pose of each image, wherein a pose includes a position and an orientation information of the underlying camera, including steps of: a) receiving a set of input images, b) defining a working set, c) initializing an image cluster, d) further growing the image cluster: d1) selecting one image from the working set that features overlap with at least one image already in the cluster, e) continuing with step b) if there remain images in the working set; if not, f) generating and providing as output the corridor map using the recovered camera poses.

7 Claims, 3 Drawing Sheets

(56) References Cited

U.S. PATENT DOCUMENTS

| | | | |
|---|---|---|---|
| 11,593,915 B2* | 2/2023 | Gallina | G06T 3/4038 |
| 11,682,170 B2* | 6/2023 | Haramaty | G06T 15/08 |
| | | | 345/419 |
| 2017/0084037 A1 | 3/2017 | Barajas Hernandez et al. | |
| 2018/0040137 A1* | 2/2018 | Barajas Hernandez | ............... |
| | | | G06V 10/443 |

* cited by examiner

METHOD AND DEVICE FOR GENERATING A PHOTOGRAMMETRIC CORRIDOR MAP FROM A SET OF IMAGES

CROSS REFERENCE TO RELATED APPLICATIONS

This application is the US National Stage of International Application No. PCT/EP2020/077309 filed 30 Sep. 2020, and claims the benefit thereof. The International Application claims the benefit of European Application No. EP19201148 filed 2 Oct. 2019. All of the applications are incorporated by reference herein in their entirety.

FIELD OF INVENTION

The invention relates to a method and a device for generating a photogrammetric corridor map from a set of input images by recovering a respective pose of each image, wherein a pose comprises a position and an orientation in-formation of the underlying camera.

BACKGROUND OF INVENTION

Corridor mapping is the process of stitching several individual photographs into a common map, the photographs being taken along a recording corridor, using mobile platforms such as airplanes, helicopters, or unmanned aerial vehicles (UAVs) equipped with airborne recording equipment.

However, photogrammetric corridor mapping can be complex and/or expensive, because when stitching individual images together, an accurate knowledge of the camera's pose (position and orientation) is necessary. Classically in survey-grade photogrammetry, pose is obtained with the help of costly inertial navigation systems (INS) in combination with high-accuracy global navigation satellite systems (GNSS), and refined with the help of (manually surveyed) ground control points (GCPs).

Using low-cost inertial navigation systems mountable on consumer-grade UAVs, absolute positional accuracy ranging from several decimeters to the meter range is possible. While high-accuracy inertial navigation systems are available commercially, the cost of such systems can be prohibitive, easily making for the most expensive component onboard a UAV and often exceeding the cost of the UAV itself.

In contrast, centimeter-accurate georeferencing absent of any need of INS measurements is possible using an incremental Structure from Motion (SfM) pipeline albeit traditionally in conjunction with an adequate distribution of manually surveyed GCPs.

Taking a "classical" incremental SfM approach absent of GCPs, sparse matches are in a first stage computed between pairs of images deemed likely to exhibit overlap. In a next stage, these matches are used, for each such pair of images, in the aim of recovering relative pose for the underlying cameras, with respect to which outlier matches are culled, and inliers triangulated. Beginning with one pair of images for which relative pose is recovered, additional images are added to the reconstruction incrementally (and their underlying relative camera pose recovered), using a camera resectioning procedure with respect to shared sparse matches. Shared matches are thus used to construct tracks of "tie points" across frames in image space, with each track associated with a single triangulated point in object space. Such a reconstruction is refined, e.g. for every n images added using bundle adjustment (BA). BA minimizes a function of image residuals (known also as "reprojection errors") given by the distance in image space between each tie point and the projection to the image associated with the tie point in question of its triangulated counterpart. Following every such refinement, tie points whose image residual exceeds a threshold can be removed in the aim of ensuring that poor tie points do not influence the reconstruction. A common approach to georeferencing the resulting reconstruction without recourse to INS measurements or GCPs is to subsequently compute and apply a similarity transformation relating estimated camera centers to their corresponding GNSS positions. (Critically, for it to be possible to compute a unique similarity transformation, at least three camera center-to-GNSS position correspondences must be available, and must not all be collinear.) Optionally, a refinement of the transformed reconstruction can in a final step be attempted by carrying out a "GNSS-BA" variant of BA that minimizes not only reprojection errors, but distance between estimated camera centers and the corresponding GNSS positions as well.

However, imagery acquired along a single corridor characteristically features pairwise overlap and thereby sparse matches only in the direction of flight. Relying on such image residuals alone, corridor mapping using an incremental SfM pipeline as described above faces two challenges in particular. On the one hand, such reconstructions stiffer from a propensity to gradually accumulate drift, as small errors in recovered pose for overlapping images of one camera impacts the recovered pose of the next. On the other, the occasional occurrence of weak sparse matches between neighboring frames due, e.g. to repetitive structure in agricultural areas or to the presence of specular surfaces such as water bodies can prevent the construction of a single connected reconstruction.

SUMMARY OF INVENTION

It is an objective of the invention to overcome the disadvantages in prior art and to provide a simple, but accurate procedure, i.e. a respective device for generating a photogrammetric corridor map from a set of images.

The objective of the invention is solved by a method for generating a photogrammetric corridor map from a set of input images by recovering a respective pose of each image, wherein a pose comprises a position and an orientation information of the underlying camera and following steps are executed:
  a) Receiving a set of input images acquired with a camera along a corridor flight path and a corresponding set of input camera positions,
  b) Defining as a working set the subset of input images for which corresponding pose has not yet been recovered,
  c) Initializing an image cluster:
    c1) Incrementally recovering pose for images from the working set until pose for at least three images has been recovered and such that not all recovered camera positions are collinear using a method for classical incremental Structure from Motion pipeline,
    c2) Computing a similarity transformation transforming the recovered camera positions to the corresponding input camera positions,
    c3) Applying the similarity transformation to the recovered camera poses in the image cluster,
  d) Further growing the image cluster:

d1) Selecting one image from the working set that features overlap with at least one image already in the cluster, d2) Adding the image to the cluster by recovering, via camera resectioning, the pose of its underlying camera relative to the camera poses corresponding to the images already in the cluster, d3) Performing a GNSS bundle adjustment algorithm to refine the poses of the cluster, if at least a predefined number of images have been added since the last invocation of the GNSS bundle adjustment algorithm, d4) Continuing with step d1), if there remain images in the working set that feature overlap with at least one image already in the cluster; if not, continuing with step e), e) Continuing with step b) if there remain images in the working set; if not, continuing with step f), f) Generating and providing as output the corridor map using the recovered camera poses.

Thus, an efficient yet cost-effective generation of corridor maps is achieved, which requires neither a costly INS nor GCPs. As such, the use of commercial grade UAVs is supported, and a low-cost system is thus enabled.

In the context of the present invention it can be understood that GNSS bundle adjustment means a variant of bundle adjustment minimizing not only reprojection errors but residuals between recovered camera position and input camera position as well to refine the poses of the cluster, if at least a predefined number of images have been added since the last invocation of the bundle adjustment algorithm.

A corridor map in the sense used above can be understood as an orthophoto, a 2.5D elevation map, a contour map, or any other georeferenced product that can be derived using images and corresponding camera pose.

The input images can be acquired with a camera, e.g. in visible or IR spectrum. Thus, the set of input images is acquired with a camera that operates in an optical visible or an IR spectrum.

The input camera positions can be acquired with a positioning sensor like a GNSS-receiver.

In a further development of the invention it is intended that at least one image from the set of images overlaps at least partially with at least one further, adjacently captured image in an overlapping area, but not necessarily acquired along a single flight path.

In a further development of the invention it is intended that the predefined number of images is at least 3, advantageously at least 5, more advantageously at least 10.

Thus, the calculation efficiency of the algorithm can be improved.

The objective of the invention is also obtained by a device for generating a photogrammetric corridor map from a set of images, comprising a computing unit and a memory unit, wherein the device is configured to receive and store the set of images in the memory, which is captured along a trajectory and which includes corresponding positioning information about the acquisition location of the respective image from the set of images, and the device is further configured to perform the method according to the invention, and to provide the corridor map from the memory.

BRIEF DESCRIPTION OF THE DRAWINGS

The invention will be explained in more detail with reference to an embodiment example shown in the accompanying drawings. In the drawings shows.

DETAILED DESCRIPTION OF INVENTION

The invention is not restricted to the specific embodiments described in detail herein, but encompasses all variants, combinations and modifications thereof that fall within the framework of the appended claims.

According to the invention the incremental SfM pipeline outlined above is a "multi-cluster" variant of incremental SfM, addressing both aforementioned challenges inherent to classical incremental SfM by making use of GNSS positions while relying neither on the presence of a costly high-accuracy INS nor on the availability of GCPs.

In the context of the present embodiment of the invention, "GNSS positions" refer to GNSS positions obtained using the real-time kinematic (RTK) technique or via post-processing, capable of yielding point measurement accuracy in the centimeter range.

In the present embodiment of the invention, such GNSS positions can additionally be used to ameliorate the quadratic complexity of naively carrying out sparse matching between all $N(N-1)/2$ possible pairs of the N input images.

In the context of the present embodiment of the invention, the displacement (i.e., "lever arm") from a camera center to a phase center of the GNSS antenna has been considered.

In the context of the present embodiment of the invention, overlapping images are understood to be images that share overlap with respect to their respective ground footprints, i.e., the area on the ground seen from the viewpoint of the camera.

1. Sparse Matching

Sparse matches are computed between pairs of input images using SIFT, aided by the widely employed "ratio test" to discard matches deemed spurious.

In order to alleviate the quadratic complexity of naively computing sparse matches between all $N(N-1)/2$ possible pairs of the N input images, a "pre-matching" step is first carried out in order to determine the subset of image pairs upon which to restrict attention. In contrast to methods intended for unordered collections of input images that borrow from image retrieval techniques by quantizing keypoint descriptors to a vocabulary of "visual words", the present pre-matching approach makes no assumptions concerning image content, which in the context of corridor mapping risks being repetitive.

1.1. Pre-Matching

Pre-matching is carried out assuming a predominantly nadir acquisition scenario by estimating, for each image $I_i$, the ground surface footprint of the corresponding camera $C_i$ and determined into which other cameras $C_j$ that footprint projects. Let $\wp \subset \mathbb{R}^3$ denote the set of input GNSS positions, expressed in a local Earth-centered Earth-fixed (ECEF) coordinate frame. For each image $I_i$ where a corresponding GNSS position $P_i \in \wp$ is available, the camera center $C_i \in \mathbb{R}^3$ of the corresponding camera $C_i$ is taken to co-incide with $P_i$. Two of the three degrees of freedom (DoF) of the rotational component of the approximated pose ($\tilde{R}_i$, $\tilde{t}_i) \in SE(3)$ of $C_i$ are resolved by assuming a vertical gravity vector; the remaining DoF is obtained by rotating the camera in-plane to point to the GNSS position associated with the next image with respect to a time stamp. Flight direction is parameterizable with respect to either the x- or y-direction of the camera coordinate frame. Finally, elevation above ground is estimated using the Shuttle Radar Topography Mission (SRTM) elevation model. An illustration of such footprints and corresponding approximated camera poses is provided in FIG. 1.

Figure 1:
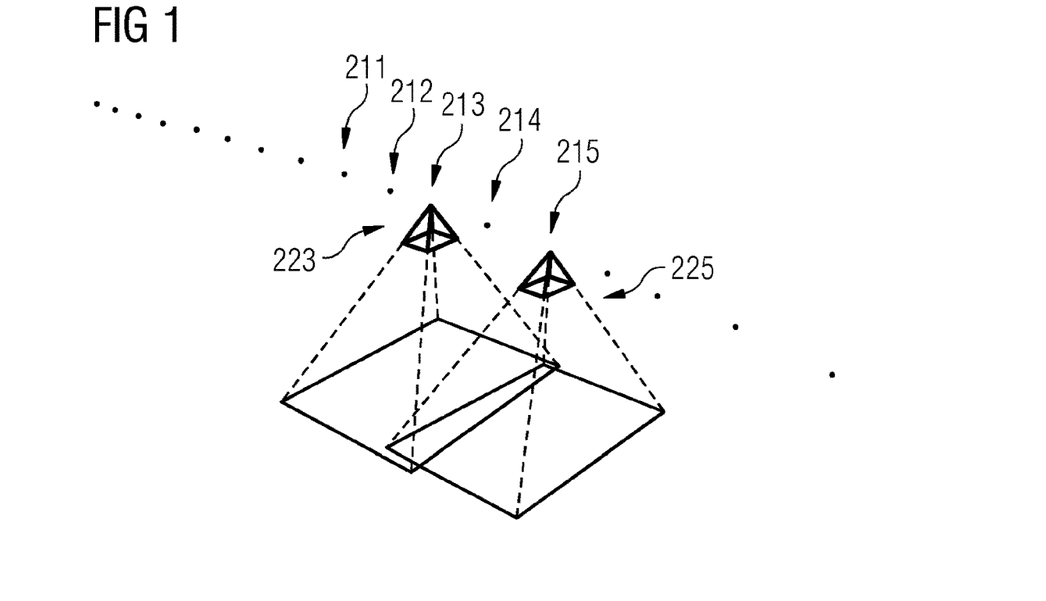
FIG. 1 an illustration of ground surface footprints in principle.

FIG. 1 illustrates ground surface footprints in principle, spanned with respect to the approximated camera poses 223, 225 corresponding to a pair of GNSS positions 213, 215 out of the GNSS positions 211-215, with elevation above ground estimated using the SRTM elevation model. For each image, its footprint is projected to the image plane of all its pre-match candidates obtained using metric queries on a kd-tree in order to determine the subset of image pairs over which to subsequently carry out sparse matching.

Initial pre-match candidates $I_j$ for each $I_i$ considering only $i<j$ in order to ensure that sparse matching be carried out only once per pair are obtained by means of metric queries on a kd-tree.

This list is subsequently culled using ground surface footprints obtained in the manner outlined above, by projecting a given footprint to each corresponding pre-match candidate camera's image plane and determining whether overlap with the image plane is present.

Note that in contrast to reasoning uniquely in terms of time stamp or metric queries using kd-trees, the proposed method has the advantage of being able to elegantly handle stark variation in elevation above ground.

1.2. Sparse Matching

The classical two-image sparse matching pipeline comprises
  (i) detecting, per image, a set of "keypoints",
  (ii) computing, per keypoint, a "descriptor" (or "feature") characterizing the keypoint, and
  (iii) matching, per pair of images $I_i$, $I_j$ under consideration of keypoints with respect to their associated descriptors, as determined to exhibit overlap in the above pre-matching step pairs, keypoints with respect to their associated descriptors.

Turning to the Scale Invariant Feature Transform (SIFT) of Lowe to carry out sparse matching, SIFT combines a keypoint detector based on Difference of Gaussians (DoG) offering partial invariance to rotation, translation, and scale (i.e., to similarity transformations), with a keypoint descriptor that offers partial invariance not only to similarity transformations, but to illumination changes and noise as well. In order to reduce the number of false matches, Lowe's ratio test is employed for the matches from an image $I_i$ with respect to an image $I_j$, in that both the nearest and second nearest match are extracted; if the relative magnitude of the two distances is small, the match is deemed spurious and is discarded from further consideration.

2. Pose Recovery

The pose recovery stage aims to recover, for each input image $I_i$ the absolute pose $(R_i, t_i) \in SE(3)$ of the corresponding camera at the moment of acquisition, relative to a georeferenced coordinate frame. Unless provided and fixed, the focal length and principal point as well as two tangential and three radial distortion coefficients according to the distortion model of Brown can be estimated jointly for each set of images acquired using a common physical camera. These intrinsic parameters yield a 3×3 camera calibration matrix $K_{c(i)}$ and distortion coefficients c(i) as a 5-tuple, where c(i) indexes the physical camera associated with $I_i$. The pose recovery stage in turn gives the absolute pose of the respective camera of each image $I_i$ that could successfully be recovered in terms of $C_i=(K_{c(i)}, \delta_{c(i)}, R_i, t_i)$. In a first step, a match graph $\mathcal{G}$ based on sparse matches extracted between pre-matched pairs of images is constructed, where each node i represents an image $I_i$ and where the presence of an edge between nodes indicates the associated image pair is purported to exhibit overlap. Using the match graph $\mathcal{G}$ and the available GNSS positions $\wp$ as input, the "multi-cluster" variant of incremental SfM according to the invention proceeds to recover the respective camera poses for the input image collection with respect to a georeferenced coordinate frame. For at least every n images for which camera pose has been newly recovered, the present variant of SfM refines the reconstruction using a variant of bundle adjustment ("GNSS-BA"). In addition to image residuals minimized by traditional BA, GNSS-BA minimizes position residuals computed, respectively, as a function of reconstructed camera center and corresponding GNSS position.

2.1. Match Graph

The match graph $\mathcal{G}$ is constructed such that each image $I_i$ is associated with a node i, and each pair of matching images $(I_i, I_j)$ with an edge (i, j). In order to construct the match graph, the five-point algorithm is used within a RANSAC loop in the aim of estimating, for each pair $(I_i, I_j)$ of pre-matched images, the corresponding essential matrix $E_{i,j}=[t_{i,j}] \times R_{i,j}$ relating $I_i$ and $I_j$. The pose $(R_{i,j}, t_{i,j}) \in SE(3)$ of camera $C_j$ relative to the camera coordinate frame of $C_i$ is estimated up to a scaling factor by decomposing $E_{i,j}$ in a manner taking into account the cheirality constraint. This relative pose is used in turn to carry out geometric verification on the sparse matches relating the image pair by filtering away outlier matches with respect to the epipolar constraint. Pre-matched image pairs thus associated with at least some fixed minimal number of geometrically verified matches are deemed "matching". Associated with each edge of G are thus the corresponding relative pose $(R_{i,j}, t_{i,j})$ and the set of geometrically verified sparse matches.

2.2 Multi-Cluster SfM

A common approach to obtaining a georeferenced reconstruction from a collection of images without recourse to INS measurements or GCPs is in a first step to
  (i) apply a classical incremental SfM pipeline as outlined before to the input image collection. To georeference the resulting reconstruction,
  (ii) a 7 DoF similarity transformation (s, R, t), where (R, t)∈SE(3) and s denotes a nonzero scaling factor transforming estimated camera centers to their corresponding GNSS positions is then computed and applied. A naive approach to overcoming accumulated drift would be to subsequently attempt refining the transformed reconstruction by
  (iii) carrying out a "GNSS-BA" variant of BA taking into account residuals computed as a function of transformed camera centers and corresponding GNSS positions, in addition to classical image residuals (FIG. 2).

Figure 2:
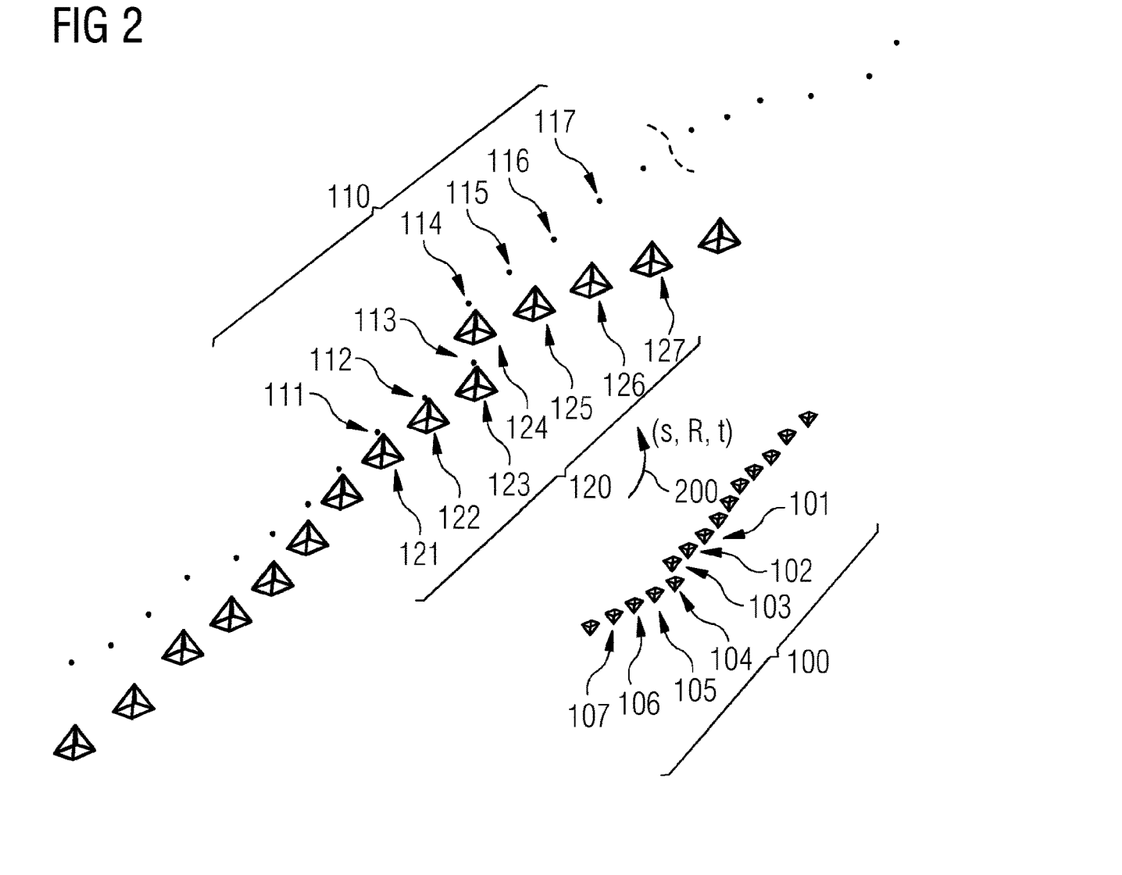
FIG. 2 an example of a naive approach according to prior art.

FIG. 2 shows an example of a naive approach.

A set 100 of raw GNSS positions is depicted, comprising raw GNSS positions 101-107 with a camera center (i.e., recovered camera position) and an image plane (thus illustrating the recovered orientation) for each recovered relative camera pose.

A set 110 of transformed GNSS positions, comprising transformed GNSS positions 111-117 as a set 110, is transformed from the set 100 by a transformation function 200, representing a similarity transformation (s, R, t).

The camera poses for image collection are recovered by means of a classical incremental SfM pipeline, georeferenced in a final step using the similarity transformation 200 (s, R, t) relating reconstructed camera centers 121-127 as a set 120 and GNSS positions 111-117 of set 110.

With other words, a set of recovered camera poses 120 with recovered camera poses 121-127 is georeferenced by estimating and applying a similarity transformation relating estimated camera positions to underlying GNSS positions.

Refinement of this transformed reconstruction can be attempted using GNSS-BA, taking into account position residuals in addition to classical image residuals. However, in the presence of enough accumulated drift, GNSS-BA will remain trapped in a local optimum and thus fail to correct for the drift. Moreover, it is only for images belonging to a single connected "cluster" (corresponding to GNSS positions colored black) that respective camera pose can be recovered.

What renders such an approach inherently naive is that in the presence of enough accumulated drift in its initialization, GNSS-BA like any optimization technique based on iterative non-linear least squares will fail to converge to the desired optimum. An additional disadvantage of the approach is that absolute pose can be recovered only with respect to a set of images corresponding to a connected subgraph of $\mathscr{G}$, since relative pose between images belonging to different subgraphs cannot be determined. In this sense, the naive approach can recover pose only for what amounts to a single connected "cluster" of images and can thus fail to recover from the potential occurrence of weak sparse matches between pairs of overlapping frames.

The approach according to the invention proceeds in a variation on the manner outlined above, computing and applying a similarity transformation not on the output of a classical incremental SfM pipeline run over the entire input image set, but rather only on a minimal connected subset with respect to $\mathscr{G}$. This minimal subset is selected in accordance with a "similarity check" intended to ensure that computation of a similarity transformation is possible; accordingly, in addition to requiring at least three images with recovered pose and associated GNSS positions, those GNSS positions are required to be non-collinear. Such an initializing "image cluster" is then
  (i) transformed using a similarity transformation relating camera centers to corresponding GNSS positions, and then
  (ii) grown as far as possible, undergoing refinement using GNSS-BA for at least every n newly added images. If a cluster can no longer be grown but there remain images for which pose has yet to be recovered, the attempt is made to
  (iii) initialize and grow a new cluster.

Proceeding accordingly thus serves not only to ensure that drill of the sort possible using the above naive approach not be permitted to accumulate prior to carrying out refinement using GNSS-BA, but also to enable recovery from failure to compute a single connected reconstruction.

Figure 3:
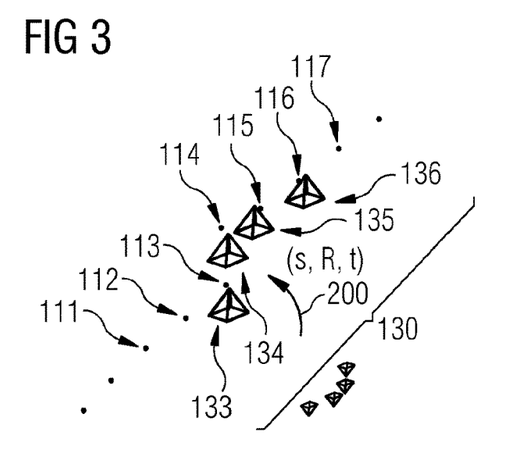
FIGS. 3-5 an embodiment of the method according to the invention.
Figure 4:
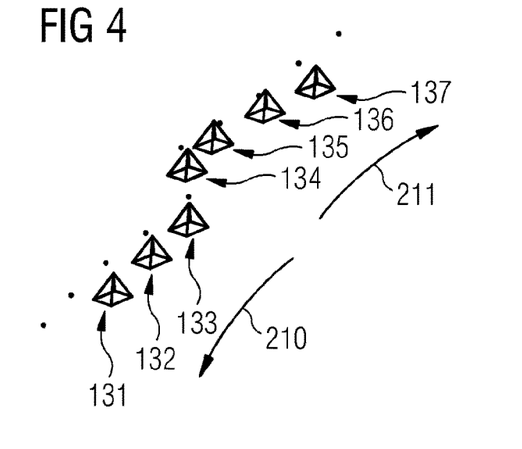
Figure 5:
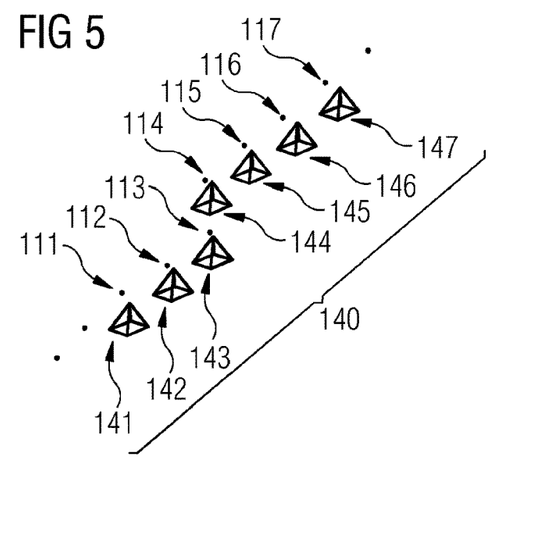

FIG. 3 to FIG. 5 show an example for a multi-cluster SfM.

FIG. 3 shows the cluster initialization over a minimal connected subset 133-136 of camera positions, i.e. images using classical incremental SfM, subsequently transformed using a similarity transformation relating reconstructed camera centers and GNSS positions.

With other words, the minimal, initializing set 130 of recovered camera poses 133-136 is georeferenced by estimating and applying a similarity transformation relating estimated camera positions to underlying GNSS positions.

Next, the cluster is grown according to FIG. 4 by recovering pose for additional images via spatial resection as depicted by direction 210, 211 of appending images, and after having newly added at least n images 131, 132 and 137 in turn FIG. 5 refined using GNSS-BA and yielding refined camera poses 141-147 of the refined camera pose set 140, a process repeated until no more images can be added to the cluster as a full set 140. If images remain for which pose is yet to be determined, the attempt is made to initialize a new cluster, likewise grown as far as possible.

As already said, the growing 210, 211 of the cluster outwards by adding images that overlap with images already present in the cluster is depicted in the figure, wherein the recovered camera poses 131, 132 and 137 are added.

In other words, the set of recovered camera poses 140 with recovered camera poses 141-147 is georeferenced by estimating and applying a similarity transformation relating estimated camera positions to underlying GNSS positions and refined using GNSS-BA (note the consideration of the "lever arm").

Note that pose can also be recovered for images acquired during GNSS outages; such images, however, are excluded from consideration in the similarity check, and do not contribute respective position residuals to GNSS-BA.

2.3. GNSS-BA

Bundle adjustment (BA) serves to refine existing camera poses by minimizing an objective function of the form $$\sum_i \rho_i(\|\epsilon_i^{im}\|^2)$$

where i iterates over the set of all image residuals $\epsilon_i^{im}$, giving the distance in pixels between the ith tie point and the projection of its triangulated counterpart, and where the functions $\rho_i$ serve to dampen the influence of outlier residuals. For instance, each $\rho_i$ is set to the same Huber loss. The "GNSS-BA" objective function is proposed to minimize is $$\sum_i \rho_i(\|\epsilon_i^{im}\|^2) + \lambda \cdot \sum_j N_j \cdot \rho_j(\|\epsilon_j^{pos}\|^2)$$

where j iterates over the subset of cameras $C_j$ for which a GNSS position $P_j \in \mathscr{P}$ was provided, expressed in a local ECEF Euclidean coordinate frame. While the image residuals $\epsilon_i^{im}$ are computed as in the penultimate equation, the position residuals $\epsilon_j^{pos}$ are given in meters by $$\epsilon_j^{pos} = (C_j + R_j v) - P_j$$

where $C_j = -R_j t_j$ denotes the estimated camera center corresponding to $I_j$, and $(R_j, t_j)$ the estimated absolute pose. The vector v denotes the offset (i.e., "lever arm") from the camera center to the phase center of the GNSS antenna, expressed in the coordinate frame of the camera. Multiplication by factor $N_j$ in the penultimate equation is intended to balance the relative influence of image and position residuals. In the present embodiment, $N_j$ is set to the number of image residuals associated with $C_j$. In an alternative embodiment, $N_j$ could be chosen in another manner. The parameter $\lambda \in \mathbb{R}^+ \cup \{0\}$ provided by the user serves to weight the influence of position residuals relative to image residuals, with respect to their balanced representation. Minimization of the first two formulas above is carried out via the Ceres solver using an implementation of the Levenberg-Marquardt algorithm.

3. Output Corridor Map Generation

With the pose recovery stage completed, dense scene geometry can be recovered using a (multi-view) stereo algorithm. Next, using conventional techniques, the recovered scene geometry can be used to generate a georeferenced 2.5D digital surface model (DSM), which in turn can be textured with input images given respective recovered camera poses to obtain a corresponding georeferenced (true) orthophoto, in effect a map obtained by stitching the input images.

Figure 6:
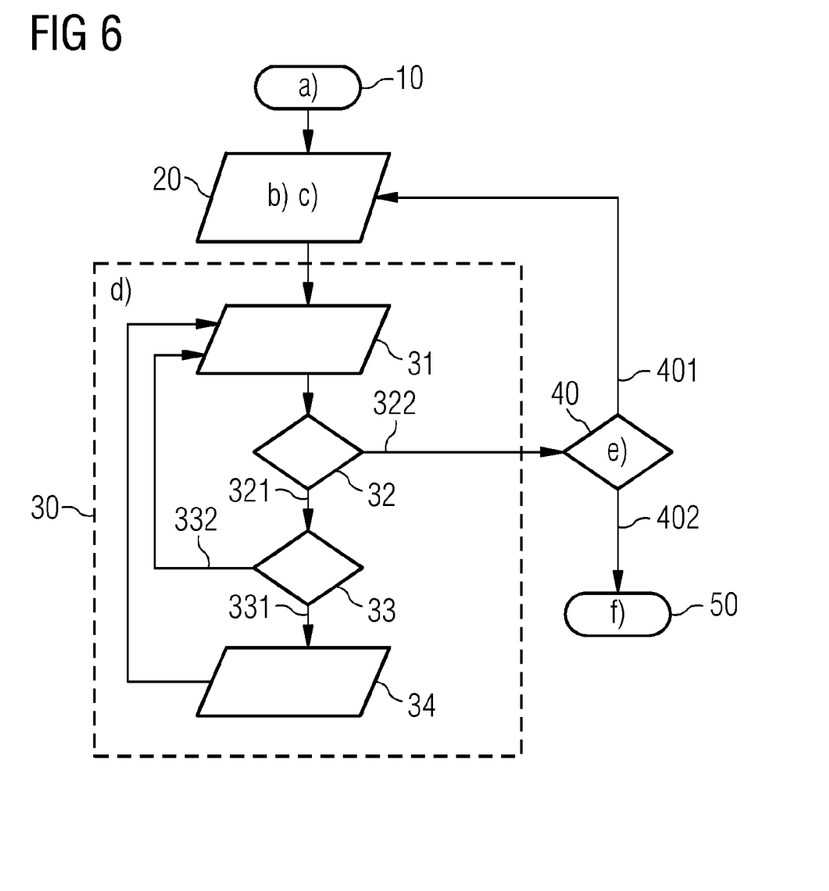
FIG. 6 an embodiment with a flowchart of the method according to the invention.

FIG. 6 shows a flowchart of an embodiment of the method according to the invention.

The method for generating a photogrammetric corridor map from a set of images by recovering a respective pose of each image, wherein a pose comprises a position and an orientation information of the underlying camera comprises following steps:
- a) Receiving a set of input images acquired with a camera along a corridor flight path and a corresponding set of input camera positions,
- b) Defining as a working set the subset of input images for which corresponding pose has not yet been recovered,
- c) Initializing an image cluster:
  - c1) Incrementally recovering pose for images from the working set until pose for at least three images has been recovered and such that not all recovered camera positions are collinear using a method for classical incremental Structure from Motion pipeline,
  - c2) Computing a similarity transformation transforming the recovered camera positions to the corresponding input camera positions,
  - c3) Applying the similarity transformation to the recovered camera poses in the image cluster,
- d) Further growing the image cluster:
  - d1) Selecting one image from the working set that features overlap with at least one image already in the cluster,
  - d2) Adding the image to the cluster by recovering, via camera resectioning, the pose of its underlying camera relative to the camera poses corresponding to the images already in the cluster,
  - d3) Performing a GNSS bundle adjustment algorithm to refine the poses of the cluster, if at least a predefined number of images have been added since the last invocation of the GNSS bundle adjustment algorithm,
  - d4) Continuing with step d1), if there remain images in the working set that feature overlap with at least one image already in the cluster; if not, continuing with step e),
- e) Continuing with step b) if there remain images in the working set; if not, continuing with step f),
- f) Generating and providing as output the corridor map using the recovered camera poses.

Step a) is represented in FIG. 6 by "receiving the set of input images" 10.

Steps b) and c) with c1) . . . c3) are represented by "initializing cluster" 20.

Step d) is depicted by "build the cluster" 30, which procedure can be described in other words used before by following substeps:

"try to add image to cluster" 31,

"approve, whether cluster is grown" 32 with result "yes" 321 or "no" 322, "approve, whether at least n images have been added" 33 with result "yes" 331 or "no" 332, "refine cluster using GNSS-BA" 34

Step e) is represented in FIG. 6 by "determination whether more images are available" 40.

Step e) is represented in FIG. 6 by "provide corridor map" 50.

The predefined number of images is in this example 5.

A specific implementation of the steps of the method according to the invention can lead to a variance of the sequence of the method steps in the claims.

Figure 7:
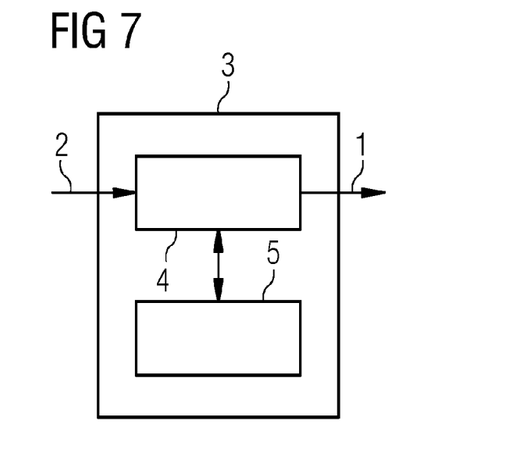
FIG. 7 an embodiment of the device according to the invention.

FIG. 7 shows an embodiment of the device according to the invention.

A device 3 generates a photogrammetric corridor map 1 from a set of input images 2 by recovering a respective pose of each image, wherein a pose comprises a position and an orientation information of the underlying camera.

The device 3 comprises a computing unit 4 and a memory 5. The device 3 is configured to receive and store the set of input images 2 in the memory 5, which is captured along a trajectory and which includes respective, not collinear position information about the place of capturing the respective image from the set of input images 2, and the device 3 is further configured to perform the method according to the invention, and to provide the corridor map 1 from the memory 5.

LIST OF REFERENCE NUMERALS

1 output photogrammetric corridor map
2 input set of images and associated GNSS positions
3 device
4 computing unit
5 memory
10 receive set of images
20 initialize cluster
30 build the cluster
31 try to add image to cluster
32 approve, whether cluster is grown
33 approve, whether at least n images have been added
34 refine cluster using GNSS-BA
40 determination whether more images are available
50 provide corridor map
100 set of recovered relative camera poses (depicted as camera center and image plane)
101-107 recovered relative camera poses
110 set of GNSS positions
111-117 GNSS positions
120, 130 set of recovered camera poses
121-127, 131-137 recovered camera poses
140 set of recovered camera poses, refined using GNSS-BA
141-147 recovered camera poses, relined using GNSS-BA
200 application of estimated similarity transformation
210, 211 depiction of growing the cluster outwards by adding images that overlap with images already present in the cluster
321, 331, 401 yes
322, 332, 402 no

The invention claimed is:

1. A method for generating a photogrammetric corridor map from a set of input images by recovering a respective pose of each image, wherein a pose comprises a position and an orientation information of an underlying camera, the method comprising:

a) receiving a set of input images acquired with a camera along a corridor flight path and a corresponding set of input camera positions, acquired with a receiver of a global navigation satellite system (GNSS), b) defining as a working set the subset of input images for which corresponding pose has not yet been recovered, c) initializing an image cluster by:
  c1) incrementally recovering pose for images from the working set until pose for at least three images has been recovered and such that not all recovered camera positions are collinear using a method for classical incremental Structure from Motion pipeline,
  c2) computing a similarity transformation transforming the recovered camera positions to the corresponding input camera positions, and
  c3) applying the similarity transformation to the recovered camera poses in the image cluster, d) further growing the image cluster by:
  d1) selecting one image from the working set that features overlap with at least one image already in the image cluster,
  d2) adding the image to the image cluster by recovering, via camera resectioning, the pose of its underlying camera relative to the camera poses corresponding to the images already in the image cluster,
  d3) when at least a predefined number of images have been added since the last invocation of a GNSS bundle adjustment algorithm, performing the GNSS bundle adjustment algorithm to minimize reprojection errors and residuals between the recovered camera positions and input camera positions and to refine the poses of the image cluster, and
  d4) when there remain images in the working set that feature overlap with at least one image already in the image cluster, continuing with step d1); otherwise, continuing with step e), e) when there remain images in the working set, continuing with step b); otherwise, continuing with step f), f) generating and providing as output the corridor map using the recovered camera poses.

2. The method according to claim 1,
wherein the predefined number of images is at least 3.

3. The method according to claim 2,
wherein the predefined number of images is at least 5.

4. The method according to claim 2,
wherein the predefined number of images is at least 10.

5. The method according to claim 1,
wherein the corridor map is an orthophoto, a 2.5D elevation map, or a contour map.

6. The method according to claim 1,
wherein the set of input images is acquired with a camera sensible in an optical visible or an IR spectrum.

7. A device for generating a photogrammetric corridor map from a set of input images by recovering a respective pose of each image, wherein a pose comprises a position and an orientation information of an underlying camera, comprising
a computing unit, and a memory,
wherein the device is configured to receive and store the set of input images in the memory, which is captured along a corridor flight path and which includes respective position information about the place of capturing the respective image from the set of input images,
wherein the device is further configured to perform the method according to claim 1, and
wherein the device is configured to provide the corridor map from the memory.

* * * * *